Aug. 15, 1939. E. D. HOLMES 2,169,952
PROPORTIONAL MIXING SCALE
Filed Feb. 28, 1938 2 Sheets-Sheet 1
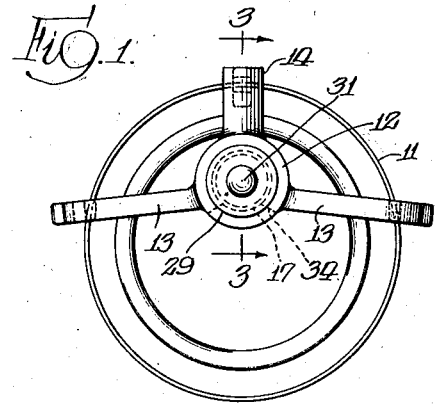
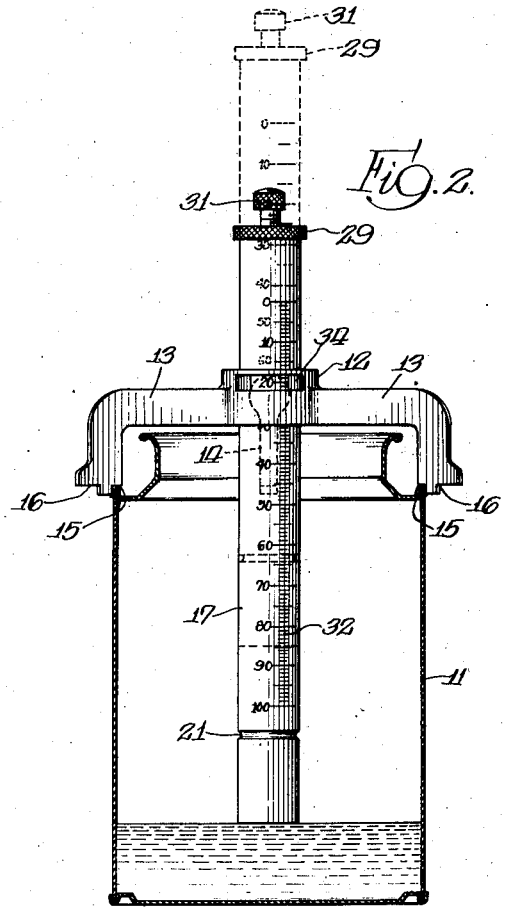
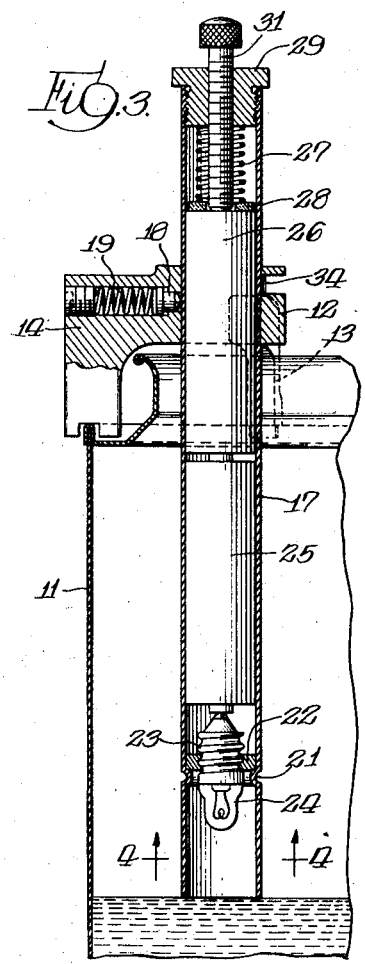
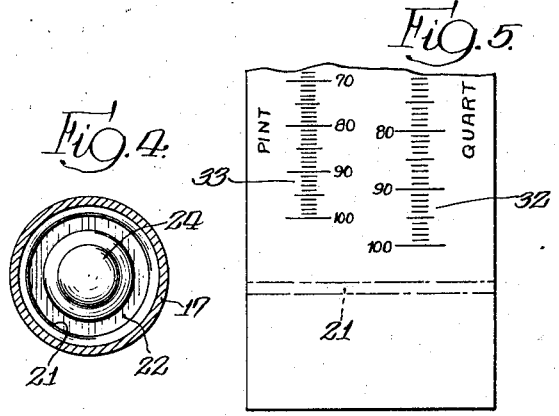
INVENTOR.
Edward D. Holmes,
BY
ATTORNEY.

Aug. 15, 1939   E. D. HOLMES   2,169,952
PROPORTIONAL MIXING SCALE
Filed Feb. 28, 1938   2 Sheets—Sheet 2
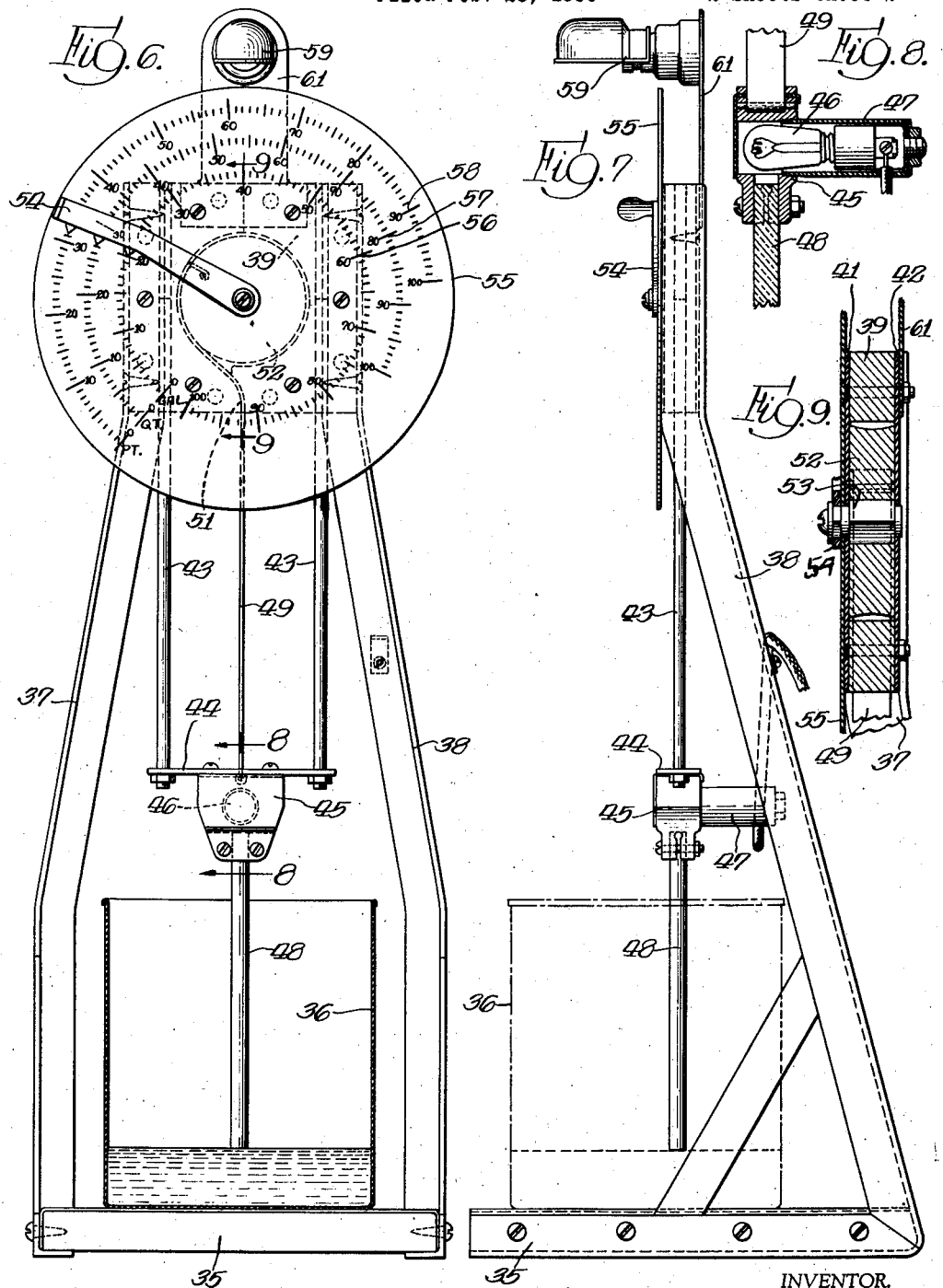
INVENTOR.
Edward D. Holmes,
BY
ATTORNEY.

Patented Aug. 15, 1939

2,169,952

UNITED STATES PATENT OFFICE 2,169,952

PROPORTIONAL MIXING SCALE

Edward D. Holmes, Chicago, Ill., assignor to Sherwin-Williams Company, Cleveland, Ohio, a corporation of Ohio Application February 28, 1938, Serial No. 193,000

3 Claims. (Cl. 33—126.7)

This invention provides a device by the use of which predetermined proportions of different liquids may be accurately measured in a mixing receptacle to insure the desired proportion of each constituent in the resultant liquid mixture.

While the principles of my invention may be utilized in accurately determining the proportions of the constituents of any type of liquid mixture, the forms of the invention herein disclosed are particularly suitable for use by paint dealers in mixing different colors of paints or lacquers for the purpose of producing for the customer any particular desired shade or color.

The average paint retailer is unable to carry in stock all of the numerous colors and shades of paints and lacquers which are now prevalently demanded by the public. To meet this situation and to enable the dealer to supply his customers with any color or shade which they may desire, the paint manufacturers furnish their dealers with data in the form of charts or tables showing how the unusual shades and colors of paints and lacquers may be produced by mixing together in predetermined accurate proportions two or more of the more common or standard colors which practically every dealer carries in stock. In this manner, the dealers are enabled to supply their customers with the unusual or less frequently demanded colors and shades without the necessity of carrying all of these unusual colors in stock.

In following this method, however, the dealers experience difficulty in accurately mesuring out the exact proportion of each constituent of the ultimate mixture, with the result that the final product is frequently slightly off-shade and therefore unsatisfactory to the customer, particularly if it be employed for repair purposes on an outomobile body or on furniture, or other articles where an imperfect match in color will be conspicuously noticeable.

The use of a measuring receptacle for this purpose is unsatisfactory, because the dealer cannot be sure that the paint level within the receptacle corresponds accurately with the marking on the outside of the receptacle, and furthermore, unless the receptacle is thoroughly cleaned after each use, some undesired color adhering to the interior of the receptacle employed in one batch will become mixed with an ensuing batch, thereby detrimentally changing the color of the ensuing batch. The same objection applies to the use of a measuring stick which is sometimes employed, and in addition, the indications on such a measuring stick soon become so paint coated as to become undiscernible.

The primary purpose of my present invention, therefore, is to provide a device which can be employed in connection with an ordinary paint can into which the dealer may pour the various colors required to produce the ultimate desired shade and by which the exact amount and required proportion of each constituent color may be accurately measured so that the exact required amount of each constituent color will be used to thereby produce an ultimate mixture of exactly the required shade.

Another purpose of the invention is to obviate the use of a separate measuring receptacle and to enable the requisite amounts of the constituent colors to be poured successively into the same paint can where, when thoroughly mixed together, they will produce exactly the intended ultimate shade or color. By the use of my invention the desired shade will not be modified by the admixture therewith of some undesirable foreign color or by any diminution in quantity of any constituent color, such as heretofore resulted from adherence of some portion of such colors to the walls of the mixing receptacle.

Other advantages and desirable features of my invention should be readily appreciated as the same becomes better understood by reference to the following description when considered in connection with the accompanying drawings.

Referring to the drawings,

Fig. 1 is a plan view of one embodiment of my invention shown in conjunction with a paint can;

Fig. 2 is a side elevation thereof, the can being shown in section;

Fig. 3 is a sectional view on the line 3—3 of Fig. 1;

Fig. 4 is a transverse sectional view on the line 4—4 of Fig. 3;

Fig. 5 is a fragmentary developed view of the lower portion of the light transmitting and height indicating tube;

Fig. 6 is a side elevation of a modified form of my invention;

Fig. 7 is an elevation looking toward the left at Fig. 6;

Fig. 8 is a sectional view on the line 8—8 of Fig. 6; and

Fig. 9 is a sectional view on the line 9—9 of Fig. 6.

Referring to the drawings more in detail, and particularly to the embodiment of the invention shown in Figs. 1 to 5 inclusive, reference character

11 indicates a receptacle which is shown in the form of a commercial paint can. A base or tripod consisting of a central cylindrical portion 12, a pair of relatively long legs 13, and a short leg 14 extend outwardly from the central portion 12, and the feet of these legs are provided with notches 15 adapted to fit the perimeter of a pint can as shown. The feet are also provided with notches 16 to fit the rim of a quart size can so that the tripod is adapted, without change, to be used in connection with either a pint or quart size can, which serves as the mixing receptacle. By reason of the leg 14 being shorter than the legs 13, the central tubular portion 12 is disposed at one side of the center of the can so as not to interfere with pouring of paint or lacquer into the can through the open top.

Within the central portion 12 there is slidably mounted a tubular member 17 which may be rotated within the tripod or adjusted vertically thereof at will, the tube being frictionally held in adjusted position by a holding plunger 18 which is urged against the perimeter of the tube by an expansion spring 19. Between its ends, the tube is provided with an inwardly extending bead or rib 21 adapted to support a disk shaped holder 22 made of insulating material and provided with a threaded opening through which the threaded plug 23 of a small electric bulb 24 may be introduced. A pair of dry batteries 25 and 26 are positioned within the tube in electrical contact with each other and with the plug 25, such contact being maintained by an expansion spring 27 interposed between an insulated washer 28 and a metal plug 29 threaded into the upper end of the tube. A circuit through the batteries and the light in the tube may be established by a switch of any convenient form, which is exemplified in the drawing by a screw 31 threaded through the plug 29 and adapted to contact with the upper end of battery 26 or to be withdrawn from contact therewith by turning the screw in one direction or the other.

The perimeter of the tube 17 is provided with two scales 32 and 33, one being designated "quart" and the other "pint." The length of each scale is equal to the depth of a can of the size indicated, and each scale is divided into one hundred graduations, the whole being so proportioned and arranged that the distance of the lower end of the tube from the bottom of the can will be indicated by that numeral on the scale which can be seen through the sight opening 34 formed in the central hub 12. For instance, in Fig. 2 the lower end of tube 17 is positioned one-fifth the depth of the can above the bottom thereof, or in other words, twenty hundredths of the depth. Consequently, numeral twenty on the pint scale is exposed to view through the sight opening 34.

The method of procedure in using this form of my invention is as follows:

Assume that a customer asks a dealer for a certain shade of paint or lacquer which the dealer does not have in stock. He refers to his chart and finds that this shade can be produced by mixing together three colors which he does have in stock in the following proportions:

|  | Percent |
| --- | --- |
| Color A | 20 |
| Color B | 50 |
| Color C | 30 |

An empty can either pint or quart depending upon the quantity required by the customer is selected, the tripod of the mixing scale is applied to the can as shown on the drawings, the tube is rotated to bring the pint or quart indicator scale into alignment with the sight opening 34, and the tube is adjusted longitudinally until the numeral 20 is visible through the sight opening. The screw switch 31 is then operated to close the circuit and light the bulb 24, the light from which is transmitted downwardly by the tube and is visible by the user only at the lower end of the tube. Paint or lacquer, as the case may be, of color A is now poured into the can, and as the level rises its approach to the lower end of the tube is clearly discernible until when the liquid finally closely approaches the lower end of the tube the light reflected from the liquid surface is no longer visible around the tube, thereby informing the user that he has poured into the can the requisite 20% of color A. The tube 17 is now adjusted upwardly into the position indicated in dotted lines in Fig. 2 so as to expose numeral 70 through the sight opening 34, thereby positioning the lower end of the tube 17 50% of the height of the can above the liquid level therein. Color B is now poured into the can until it clearly approaches the lower end of the tube and shuts off the light reflection which notifies the user that the requisite 50% of color B is now in the can. The tube is again adjusted upwardly to expose numeral 100 through the sight opening 34, and color C is added to the can until the liquid level shuts off the light reflection around the lower end of the tube, thus notifying the user that 30% of color C has been added.

With the use of this invention, the exact required proportions of each of the requisite colors to produce an ultimate mixture of the desired shade may be introduced into the can without loss in quantity of any of the colors, without the addition of any foreign colors, without the use of a measuring receptacle which requires repeated cleaning, without the use of a submerged measuring stick which is difficult of observation and becomes coated with paint, and without bringing paint into contact with any portion of my device. In case the paint should contact the extreme lower end of the tube it can be quickly and easily wiped off. The concealed source of light from which the light rays are transmitted to the lower end of the tube enables the user to very clearly see the rise of the liquid level in the can and observe its approach toward the lower end of the tube, thereby enabling him to regulate his pouring speed so that the pouring may be promptly discontinued as soon as the light reflection is shut off by the approach of the liquid in the can to the lower end of the tube. My device, therefore, contributes toward the control of the pouring and assures accuracy in the requisite amount of each of the constituent colors required to produce the ultimate desired shade.

The form of my invention illustrated in Figs. 6 to 9 inclusive possesses all of the advantages inherent in that form of the invention previously described, and while differing in structural details, embodies the same principles of operation.

Referring now to this alternative construction, it will be observed that it comprises a base 35 adapted to support a paint can 36 and a frame structure consisting of the uprights 37 and 38 connected at their upper end by guide block 39 disposed between the face plates 41 and 42 all assembled in a rigid structure.

Vertically reciprocatory guide rods 43 extend upwardly through the head of the frame formed by the guide block 39 and the uprights, the lower ends of these rods being connected by a cross bar 44. A hollow head 45 is carried by this cross bar, and within this head is disposed a light bulb 46 mounted in a rearwardly extending socket 47. A light transmitting element 48 is suspended from the head 45 immediately beneath the light bulb. This element may, if preferred, be a hollow tube such as the tube 17 previously described, or as here illustrated is a synthetic resin rod adapted to transmit light axially thereof only, or it may consist of any other suitable light transmitting medium.

The cross bar 44 and the parts carried thereby are supported by a flexible tape or ribbon 49 made of metal or other suitable material which passes through a guide slot 51 in the guide block 39 and is wound upon a wheel or windlass 52 mounted upon the shaft 53 which is journalled in the face plates 41 and 42 as shown in Fig. 9. An operating and holding arm 54 is fixed to the end of shaft 53 by which the windlass may be rotated to wind the tape 49 thereon or unwind it therefrom and suitable friction means or other preferred device interposed between the arm 54, and a stationary dial 55 mounted forwardly of plate 41 serves to hold the windlass and arm in adjusted position.

The dial 55 is provided with three circular scales or graduations indicated by reference characters 56, 57 and 58, which scales are respectively designated as "gal.", "qt." and "pt.", indicating that one is to be used when a gallon can is employed, another when a quart is employed, and the third with a pint can. Like the scales upon the tube 17 previously described, these scales are each divided into a hundred units, and the position of the arm 54 with respect to these scales will indicate to the user the height of the bottom end of the light transmitting element 48 from the bottom of the can into which such element projects. To facilitate reading of the scale, a hooded lamp 59 may be mounted in proximity to the scale upon a bracket 61 so as to eliminate the dial.

The manner of use of this form of the invention is quite similar to the form previously described. The receptacle 36 consisting of a can of the desired size, either pint, quart, or gallon, is placed in position and the light transmitting element is lowered into it by movement of the arm 54 in a counter-clockwise direction viewing Fig. 6 until the lower light emitting end of the element is spaced from the bottom of the can the requisite distance determined by the proportion of the paint or lacquer to be first introduced into the can. This distance will be determined by the position of the operating arm 54 with relation to the scale corresponding to the size of can employed. The light will now be lighted by turning on a switch, and the light rays therefrom will be transmitted longitudinally through the rod 48 and emitted at the lower end thereof. The required color of paint or lacquer is then poured into the can until the upper surface of the liquid contacts the lower end of the rod, thereby shutting off the light. The rod is then adjusted upwardly by moving the arm 54 in a clockwise direction the requisite amount, whereupon the next color will be introduced into the can and the operation will be repeated for each color required in the ultimate mixture.

It is believed that my invention in its preferred forms and many of the inherent advantages thereof will be appreciated from the foregoing without further description, and it should be manifest that the structural details illustrated and described are capable of considerable variation without departing from the essence of my invention as defined in the following claims.

I claim:

1. A device for determining the height of the surface of a liquid in a container of known capacity, comprising a supported adapted to be positioned in fixed relation to an open top container, a light transmitting element mounted on said support for vertical adjustment relatively thereto and projecting downwardly into the container, the lower end of said element terminating in a single plane parallel with the surface of the liquid in the container, a concealed source of light located entirely above said plane and so positioned that the light rays therefrom are emitted from said element only at the lower end thereof and only in a downward direction, and means operated by vertical adjustment of said element for indicating the height of said lower end above the bottom of the container.

2. A device for determining the height of the surface of a liquid in a container of known capacity, comprising a support adapted to be positioned upon the top of a container, an imperforate light transmitting tube open at its lower end only mounted on said support for vertical adjustment relatively thereto, the lower end of said tube depending into said container and having its lower edge disposed in a single plane parallel to the surface of the liquid in the container, a source of light positioned within said tube remote from said open end, the light rays from said source being emitted from said tube at the lower end thereof only and in a downward direction only, and means for indicating the position of said tube relatively to the bottom of the container.

3. A device for determining the height of the surface of a liquid in a container of known capacity, comprising a support adapted to be positioned upon the upper open end of the container, a light transmitting element suspended from said support for vertical adjustment relatively thereto, the lower light emitting end of said element being disposed in a plane parallel to the surface of the liquid in the container, a concealed source of light positioned above the lower end of said element, the light rays from said source being emitted from said element into the container in a downward direction only and only from said lower end of the element, the light rays so emitted being reflected by said liquid surface within the area defined by the element when the liquid closely approaches the lower end of said element to thereby render said rays invisible through the open top of said container, and means for indicating the vertically adjusted position of said element with respect to the bottom of the container.

EDWARD D. HOLMES.

CERTIFICATE OF CORRECTION.

Patent No. 2,169,952.　　　　　　　　　　　　　　　　August 15, 1939.

EDWARD D. HOLMES.

It is hereby certified that error appears in the printed specification of the above numbered patent requiring correction as follows: Page 1, first column, line 33, for "mesuring" read measuring; line 39, for "outomobile" read automobile; page 2, second column, line 23, for "clearly" read closely; line 69, for "end" read ends; page 3, second column, line 15, claim 1, for "supported" read support; and that the said Letters Patent should be read with this correction therein that the same may conform to the record of the case in the Patent Office.

Signed and sealed this 19th day of September, A. D. 1939.

(Seal)　　　　　　　　　　　　　　　　　　　　　　　　Henry Van Arsdale,
　　　　　　　　　　　　　　　　　　　　　　　　Acting Commissioner of Patents.